Aug. 8, 1933.   D. M. MACDONALD   1,921,086
ELECTRIC CONDENSER

Filed April 10, 1931

INVENTOR
Duncan MacKenzie Macdonald
BY
ATTORNEY

Patented Aug. 8, 1933

1,921,086

UNITED STATES PATENT OFFICE 1,921,086

ELECTRIC CONDENSER

Duncan Mackenzie Macdonald, London, England, assignor to Radio Patents Corporation, New York, N. Y., a Corporation of New York Application April 10, 1931, Serial No. 529,072, and in Great Britain April 15, 1930

9 Claims. (Cl. 175—41)

My invention relates to electrical condensers, and more particularly to dielectric and impregnating materials therefor.

In electrical condensers constructed by interleaving dielectric material with conducting layers, it is customary to impregnate the finished article with oil, wax, or similar impregnating material in order to exclude the air and moisture which would otherwise find their way between the conductors and cause current leakages—with ultimate breakdown of the dielectric.

Various impregnating materials have been proposed for this purpose, with varying degrees of success. However, the desired perfectly homogeneous dielectric, fully protected from moisture, is not obtained by these impregnating materials.

Accordingly, an object of my invention is to provide a condenser the dielectric of which is impervious to all moisture.

A further object of my invention is to provide a condenser containing a homogeneous dielectric.

Still a further object of my invention is to provide novel apparatus for and methods of sealing a condenser.

Broadly, my invention comprises a condenser in which the impregnating material comprises a solution of the dielectric material and which dissolves the edges of the dielectrics to provide a perfect seal for the condenser.

Figure 1:
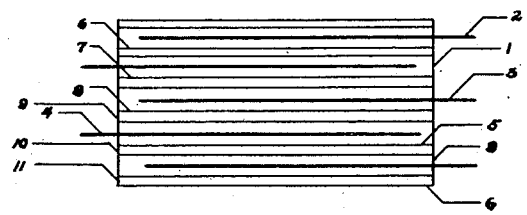

Figure 1 discloses one form of the invention in which the edges of the successive condenser plates project beyond opposite sides.

Figure 2:
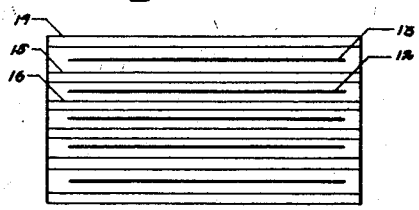

Figure 2 is an alternative construction of the condenser to which my invention may also be applied.

As shown in Figure 1, condenser 1 comprises successive conducting layers or plates 2, 3, and 4, the edges of the successive plates projecting beyond the opposite sides of the condenser. Interposed between the plates or conducting strips 2, 3, and 4, are strips of dielectric material 5, 6, 7, and 8. These are assembled in any well-known manner which is not part of this invention and, accordingly, is not disclosed.

In the preferred form of my invention, the dielectric material for the dielectrics 5, 6, 7, and 8 is a thin film of cellulose acetate or other ester.

This condenser, when assembled in any well-known manner, is then impregnated in a solution of cellulose acetate or some other ester in a non-hygroscopic solvent, such for example as is used in the manufacture of cellulose acetate varnishes; such varnishes, if sufficiently pure, are suitable for the impregnating material.

The impregnation is continued until all the spaces within the dielectric have been filled with impregnated medium. The condenser is then removed from the medium and cooled in any desired manner.

The extent of impregnation is just sufficient to dissolve a small surface layer of the dielectric and permitted to flow just sufficiently to provide an entirely uniform and homogeneous dielectric surface and to cause adjacent layers of the dielectric material to adhere to each other.

The outer edges, as at 9, 10, 11, and so forth, of the dielectric material dissolve and merge with each other, as shown for example between the dielectric layers 5 and 6 at 9, dielectric layers 6 and 7 at 10, dielectric layers 7 and 8 at 11. Thus, also providing a perfect seal for the condenser.

Although the invention is illustrated in connection with a specific type of condenser as shown in Figure 1, it will be understood that it may be used in other forms of condensers, as that shown in Figure 2 in which the condenser plates 12 and 13 are laid symmetrically between the layers of dielectric materials 14, 15, 16, and so forth.

Furthermore, in the preferred form, the invention is applied to condensers of the rolled-up type. Instead of the dielectric herein described, other forms of dielectrics, such for example as paper or other fibrous or porous materials, may be employed with the impregnating material herein described.

Furthermore it will be obvious that my invention may have other utilities than herein illustrated.

I claim:

1. An electric condenser constructed of alternate strips of dielectric material and conducting layers, and impregnated in a solution of the dielectric material.

2. An electrical condenser constructed of alternate strips of conducting layers and a dielectric of cellulose, and impregnated in a solution of cellulose acetate.

3. An electrical condenser constructed of alternate strips of conducting layers and of dielectric material, impregnated in a solvent of the dielectric material.

4. An electrical condenser constructed of alternate strips of conducting layers and of dielectric material, impregnated in a solvent of the dielectric material sufficiently to produce a homogeneous dielectric.

5. An electrical condenser constructed of alternate strips of conducting layers and of dielectric material, impregnated in a solvent of the dielectric material sufficiently to produce a homogeneous dielectric and to join the outer edges of the dielectric for sealing the condenser.

6. An electrical condenser constructed of alternate sheets of conductive material and sheets of cellulose acetate impregnated in a solution of cellulose acetate.

7. An electrical condenser constructed of alternate sheets of conductive material and sheets of cellulose acetate impregnated in a solution of a non-hygroscopic solvent of cellulose acetate 8. An electrical condenser constructed of alternate sheets of conductive material and sheets of cellulose ester and impregnated in a solution of cellulose ester.

9. An electrical condenser constructed of alternate sheets of conductive material and sheets of cellulose ester impregnated in a solution of a non-hygroscopic solvent of cellulose ester.

DUNCAN MACKENZIE MACDONALD.